INVENTORS
CHRISTOPHER J. O'SHEA
RICHARD QUINN
DONALD S. JOHNSON, JR.
ATTORNEY

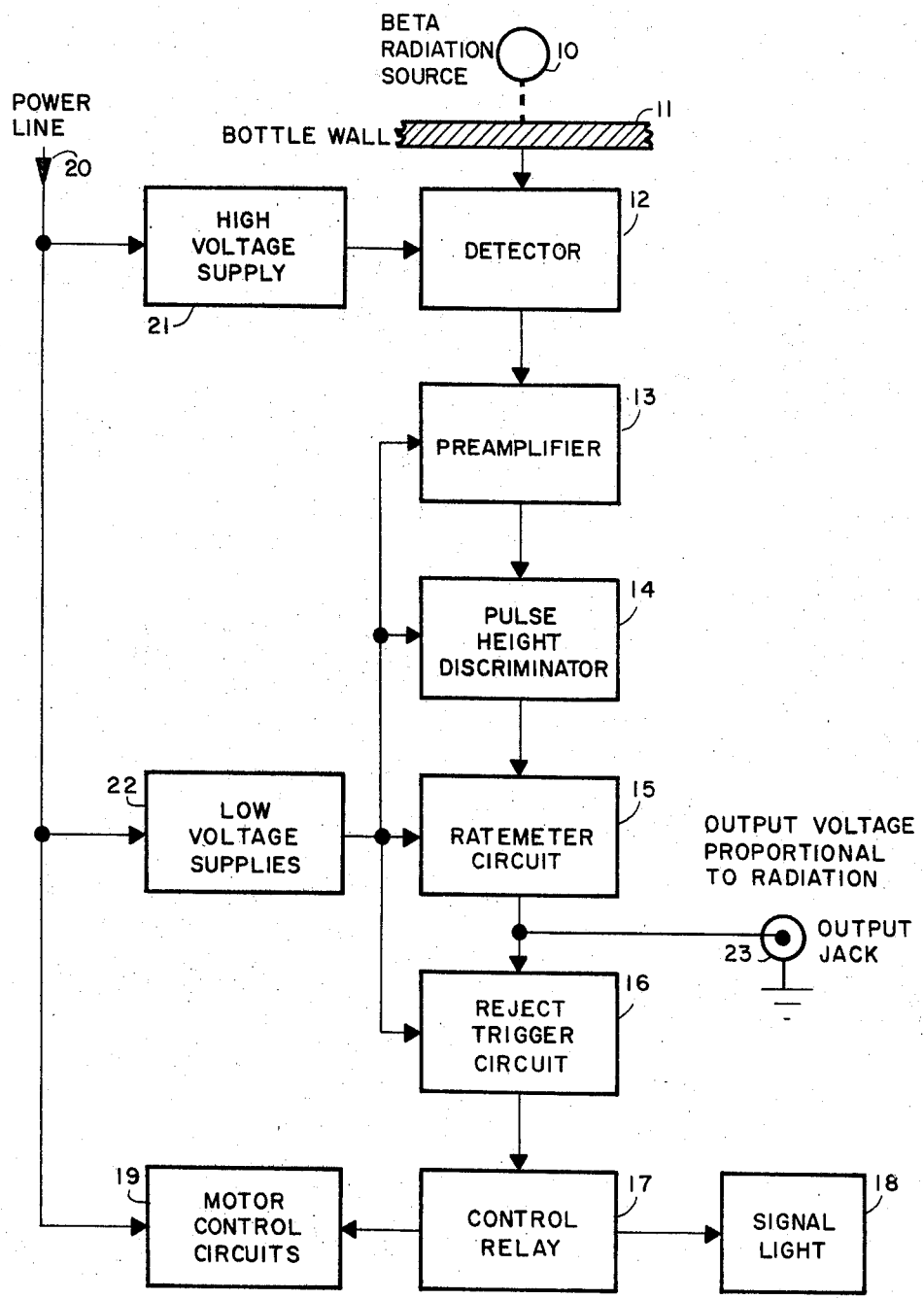

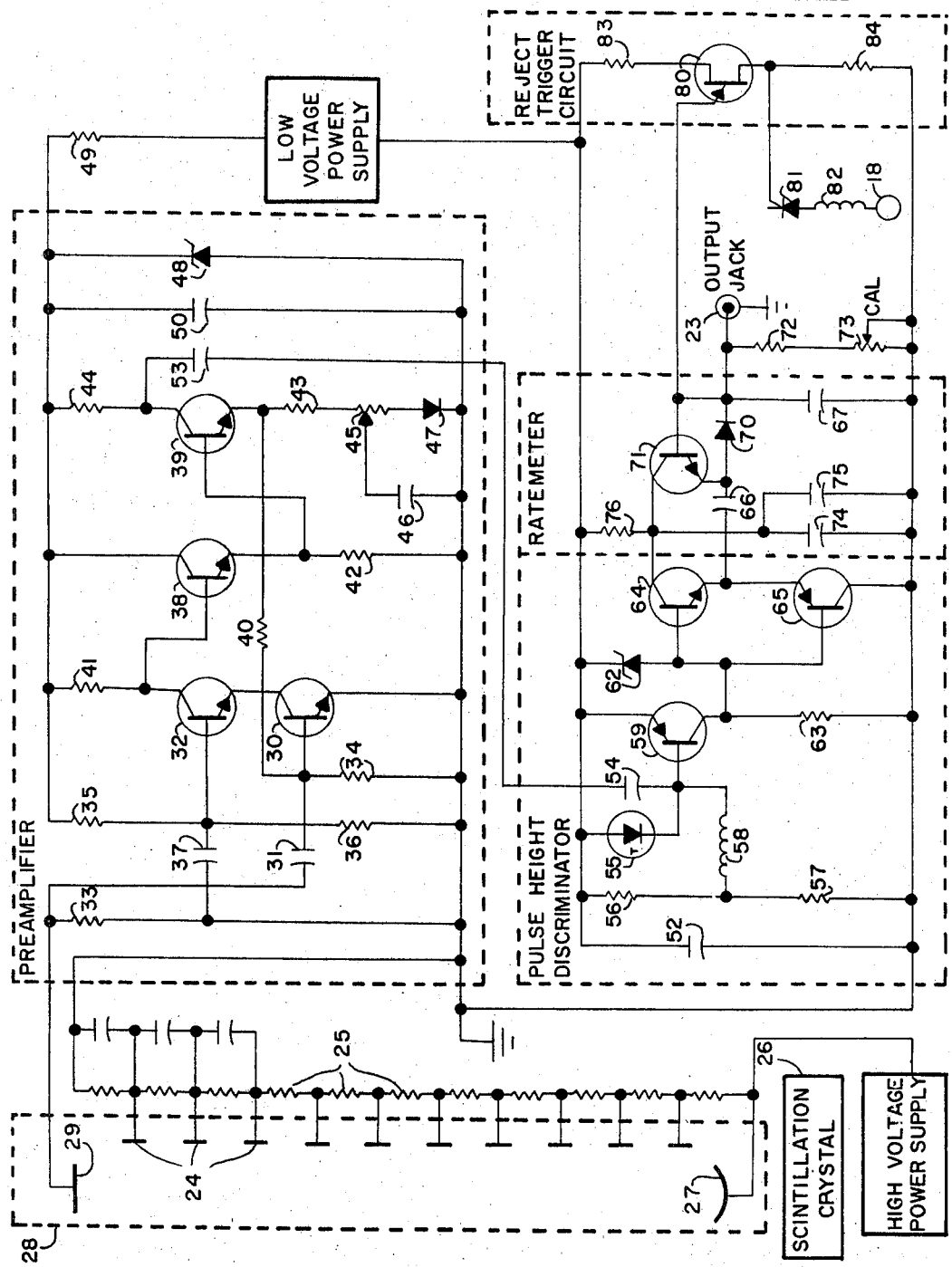

United States Patent Office 3,426,196
Patented Feb. 4, 1969

3,426,196
APPARATUS FOR DETERMINING WALL THICKNESS UTILIZING RADIATION ABSORPTION
Christopher J. O'Shea and Richard Quinn, Muncie, Ind., and Donald S. Johnson, Jr., Boulder, Colo., assignors to Ball Brothers Research Corporation, Boulder Industrial Park, Boulder, Colo., a corporation of Colorado
Continuation of application Ser. No. 339,787, Jan. 23, 1964. This application Feb. 21, 1967, Ser. No. 617,716
U.S. Cl. 250—71.5                                                 3 Claims
Int. Cl. G01t 1/16; H01j 39/18

ABSTRACT OF THE DISCLOSURE

An apparatus for testing wall thickness wherein a pulse output is produced by a radiation detector situated at the side of the wall to be tested opposite to that of a radiation source, with the produced pulse output being coupled to a pulse discriminator that generates pulses of both constant amplitude and width which are then utilized to produce an analog voltage signal which triggers a reject circuit when the level exceeds a predetermined value.

---

This application is a continuation of copending U.S. application Ser. No. 339,787, filed Jan. 23, 1964, now abandoned, entitled, "Apparatus for Determining Wall Thickness," by Christopher J. O'Shea et al.

This invention relates generally to a new and improved method and apparatus for checking the wall thickness of articles, and more particularly to a novel method and apparatus for checking the wall thickness of hollow articles by radiation absorption.

In the manufacture of hollow articles such as containers or bottles, it is desirable to test or examine a fraction or all of the articles produced in order to determine whether the wall thickness is above a fixed minimal standard for all of the articles tested. It is preferable to perform the above test or examination without damage to the article so that the rate of production is not reduced. Sometimes, after the wall of an unacceptable article has been scanned, it is desirable to determine the precise portion of the article indicated as too thin so that the particular defective article can be more carefully examined at that specific portion.

In the past, several methods have been devised for measuring the wall thickness of containers or bottles. Usually such methods employed a standard sample for constant comparison purposes, which standard sample was very difficult and expensive to construct because of the extreme accuracy required. In addition, the use of such a sample did not allow a desirably high rate of speed with an acceptable high level of accuracy. Moreover, a great deal of circuitry was required to obtain two signals, compare them and operate a trigger switch.

In most previous measuring devices employing radiation, the amplitude or energy of the radiation striking the detector was measured. As a result, any significant variations in the sensitivity of the electronic circuits or the multiplier phototube adversely affected the accuracy of the thickness measurement.

In view of the above described difficulties and shortcomings of the methods and apparatus heretofore employed, it was totally unexpected to discover a method and apparatus for checking the wall thickness of a container or bottle without continuously comparing it with a standard sample. Another advantage of the present invention is to provide a method and apparatus for indicating the particular circumferential level where the wall thickness of a container or bottle is below a minimum standard when the article is being scanned and a defect or thin spot is found. It is an additional advantage of the present invention to provide a method and apparatus for testing the wall thickness of a container or bottle having a high degree of measurement repeatability.

This invention is therefore directed to apparatus for testing wall thickness wherein radiation responsive means is spaced from the radiation source a pretetermined distance sufficient to enable a wall to be tested to be interposed therebetween, the radiation responsive means producing a pulse output dependent upon the level of radiation received, said pulses being coupled to a pulse height discriminator to produce output pulses of constant amplitude above a predetermined threshold, and said constant amplitude pulses being utilized to produce an analog voltage signal which is coupled to a reject circuit for producing a faul indication when said amplitude exceeds a predetermined level.

Other advantages and benefits of the method and apparatus of the present invention will become apparent from the following description and accompanying drawings, wherein:

FIGURE 2 is a block diagram schematically showing an electronic circuit of the present invention; and FIGURE 3 is a schematic circuit diagram showing a specific electronic circuit of the present invention.

Figure 1:
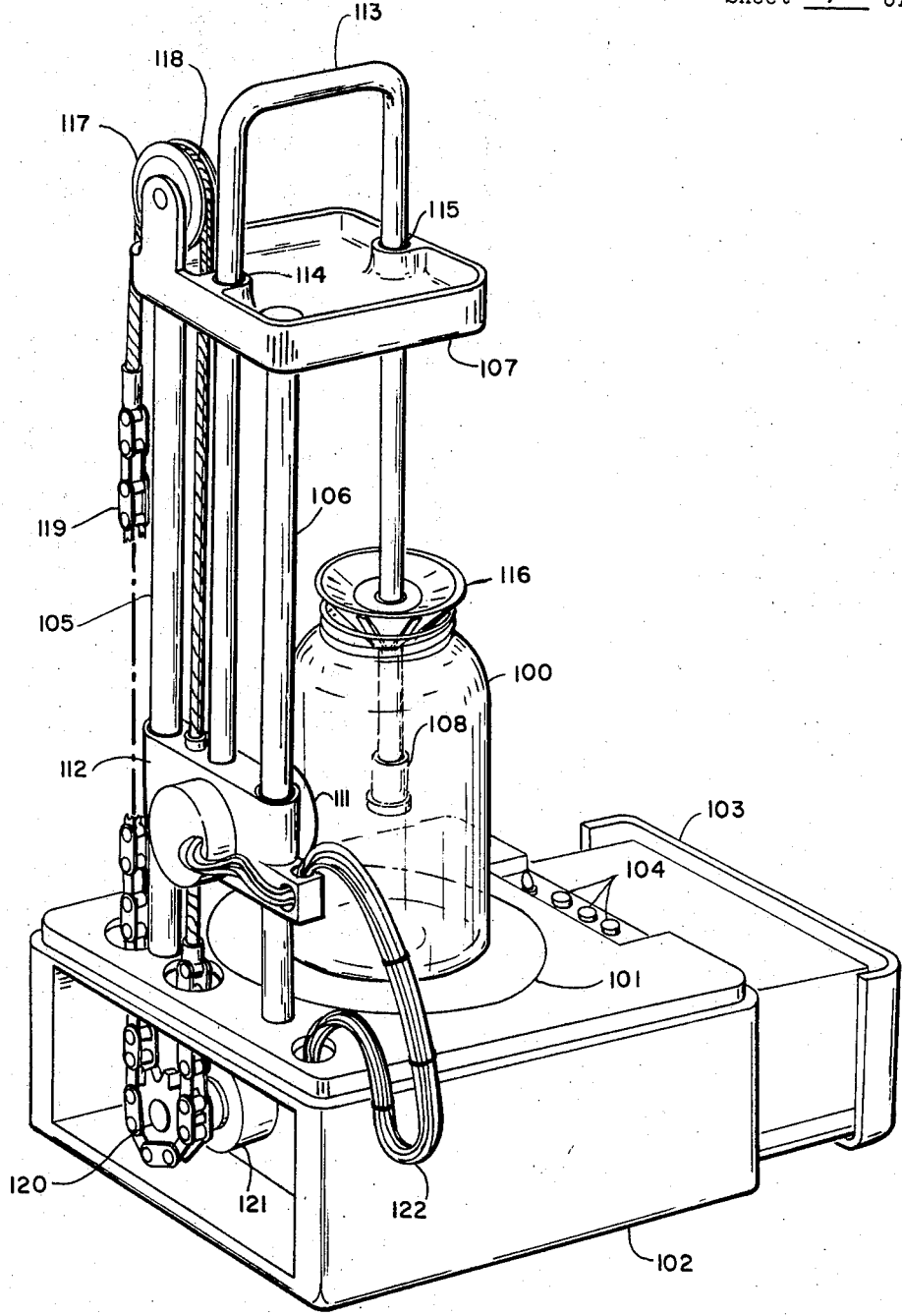
FIGURE 1 is a view in perspective of one form of apparatus of the present invention.

As shown in FIGURE 1 of the drawings, a bottle 100 to be tested rests on a turntable 101. Turntable 101 is connected to and driven by an electric motor (not shown) which is located within a housing 102. A drawer 103 is slidably mounted in housing 102 and contains electronic circuitry for the operation of the apparatus. Adjustment knobs 104 are used to adjust the apparatus during operation. Supports 105 and 106 extend upwardly from housing 102 and have secured thereto a bracket 107.

Slidably attached to supports 105 and 106 and arranged for movement therealong is a housing 112 in which a detector 111 is positioned. A radiation source 108 is maintained in a fixed spatial relationship with detector 111 by mounting the source on one end of a rod 113 which extends downwardly through a guide hole 115 in bracket 107. The opposite end of rod 113 extends downwardly through a second guide hole 114 in bracket 107 and is secured to housing 112 which moves along supports 105 and 106. A conical shield 116 is movably mounted on rod 113 adjacent to source 108 and arranged to rest on the bottle 100 (as shown) during operation of the apparatus, but slides downward over source 108 to shield it when the source 108 is withdrawn upward and out of the bottle 100. Source 108 and detector 111 may be raised and lowered by a suitable drive arrangement shown in FIGURE 1 as a cable loop 118 attached to housing 112 and supported by a pulley 117 mounted on bracket 107. A portion of the loop is formed by a chain 119 which meshes with the teeth on gear 120, driven by a reversible motor 121. This loop, when driven by motor 121, raises and lowers housing 112 along supports 105 and 106 which also raises and lowers the source 108 into and out of the bottle 100. Movement of the source and detector when turntable 101 is rotated performs a spiral scan of the wall of bottle 100. Wires 122 transmit charge impulses from the detector 111 to the circuitry located within drawer 103.

Referring to the block diagram shown in FIGURE 2, beta particles are emitted from beta radiation source 10 and are directed toward a specimen such as a bottle wall 11, the thickness of which is desired to be checked. That portion of the beta particles which passes through the bottle wall 11 is absorbed by detector 12. Detector 12 converts the absorbed radiation energy into an electric voltage signal. Detector 12 is connected to a preamplifier 13 which amplifies the voltage signal and feeds it to a pulse height discriminator 14 which generates pulses of constant amplitude when a predetermined voltage threshold level is exceeded. These constant amplitude pulses are fed into a ratemeter circuit 15 which converts a series of pulses into an analog voltage signal which actuates a reject trigger circuit 16 when the signal exceeds a preset level. The reject trigger circuit 16, when triggered, generates a pulse signal to a control relay 17. The reject trigger circuit 16 is designed so that the level at which a signal is transmitted determines whether or not the article being examined is defective.

The control relay 17 sends an impulse to a signal light 18 and also to a series of motor control circuits 19 which can be connected to one or more devices, such as a device for separating an article whose wall thickness has been indicated as less than the minimum allowed for acceptable articles. Power line 20 furnishes an electrical current to the motor control circuits 19, to a high voltage power supply 21 which supplies detector 12 with a high potential, and to a lower voltage power supply 22 for the preamplifier 13, the pulse height discriminator 14, the ratemeter 15, and the reject trigger circuit 16. The output signal from ratemeter 15 also passes to a grounded output jack 23 which makes available a signal comprising an analog voltage having an amplitude proportional to the radiation received by detector 12.

As shown in FIGURE 3, beta particles, emitted from a beta radiation source (not shown), strike a scintillation crystal 26 which emits light pulses that strike a multiplier phototube 28. The tube 28 comprises photocathode 27, resistors 25, dynodes 24, and an anode 29. A resistor 33 supplies load resistance for anode 29.

The charge pulse from anode 29 of photomultiplier tube 28 is transferred to the base of transistor 30 through capacitor 31. The value of capacitor 31 determines the frequency of the lower edge of the pass-band of amplification of the incoming pulses from anode 29. Transistor 30 is common-emitter connected and its collector is connected to and clamped for small signals by the emitter of transistor 32 which is common-base connected through capacitor 37. The shunting effect of the collector-base capacitance of transistor 30 on the fast edges of the incoming pulses from anode 29 is thereby minimized. Resistor 34 connects the base of transistor 30 to ground and supplies part of the bias necessary for the transistor's operation. Resistors 35 and 36 are series connected, the former between the low voltage line and the base of transistor 32 and the latter between the base of transistor 32 and signal ground, and form a voltage divider which establishes the D.C. emitter potential of transistor 32. Resistor 41 is connected between the low voltage line and the collector of transistor 32 and supplies collector load resistance.

The signal from the base of transistor 30 to the collector of transistor 32 experiences current gain and is fed into the base of transistor 38. The collector of transistor 38 is connected directly to the low voltage line and the emitter is connected to signal ground through resistor 42 and to the base of transisor 39. Transistor 38 provides additional current gain and impedance transformation to the signal which is fed to the base of transistor 39. Resistor 42 is the emitter-follower load resistor for transistor 38. The collector of transistor 39 is connected to the low voltage line through resistor 44 which furnishes the collector load resistance.

The emitter of transistor 39 is connected to the base of transistor 30 through resistor 40 and is a low impedance point for the extraction of a negative feedback signal current which is added to the input signal current at the base of transistor 30. Transistor 39 provides the last stage of current gain and its emitter provides a virtual ground or current sink.

Resistor 43 is connected to the emitter of transistor 39 and supplies part of the emitter load resistance as well as part of the gain control. Serially connecting resistor 43 to signal ground are emitter-resistor 45 and diode 47. Part of the signal from the emitter of transistor 39 is by-passed to signal ground through capacitor 46. Thus, the fraction of the output signal current from the emitter of transistor 39 which is fed back to the amplifier input, i.e., the base of transistor 30, which determines the gain of the closed-loop current, is adjustable by varying emitter-resistor 45 through which the signal is by-passed to ground.

Diode 47 provides temperature compensation for the D.C. emitter-base potential of transistor 30 which is temperature dependent. Resistor 49 is connected between the low voltage power supply and the low voltage line in the preamplifier and serves as a dropping resistor. Zener diode regulator 48, which is connected between the low voltage line and signal ground, serves to regulate the supply voltage for the preamplifier. Capacitor 50 is connected between the low voltage line and signal ground, in parallel with Zener diode 48, and serves to keep out noise from the power supply as well as from Zener diode 48. An amplifier output current pulse is taken from the collector of transistor 39 and fed into the pulse height discriminator through coupling capacitor 53 and 54.

The signal from capacitor 54 is fed to tunnel diode 55 which is also connected to the low voltage line as well as across the base-emitter junction of transistor 59. One terminal of inductor 58 is also connected to tunnel diode 55 and the base of transistor 59 and the other terminal is connected to resistors 56 and 57 which connect to the low voltage line and signal ground, respectively. Capacitor 52 connects the low voltage line to signal ground and serves to keep pulses out of the tunnel diode 55. A voltage divider is formed by resistors 56 and 57 and serves to bias tunnel diode 55 to about 80% of its peak current.

Fast pulses from the collector of transistor 39, sufficient to increase the tunnel diode current to the peak point current or beyond, result in the tunnel diode 55 switching rapidly to its high voltage state. Inductor 58 acts as an RF choke and establishes a fixed delay before causing tunnel diode 55 to switch back into its low voltage state.

Since tunnel diode 55 is connected across the base-emitter junction of transistor 59, the latter is turned on only during the time that tunnel diode 55 is in its high voltage state. Thus, transistor 59 remains cut off while tunnel diode 55 is in its low voltage state and is caused to saturate when tunnel diode 55 is in its high voltage state. In this manner, tunnel diode 55, inductor 58, and transistor 59 cooperate to form a fast level-discriminator which generates output pulses of fixed height and width for every input current pulse that exceeds the threshold sensitivity. The amplitude of the voltage pulses generated at the collector of transistor 59 is limited by the saturation voltage of transistor 59 when turned on, and at all other times by temperature-compensated Zener reference diode 62, which connects the collector of transistor 59 to the low voltage line.

Resistor 63 connects the collector of transistor 59 to ground and establishes the stable current through Zener diode 62. The stabilized voltage pulses emitted at the collector of transistor 59 are transmitted to a complementary pair of emitter-follower transistors 64 and 65. The collector of transistor 65 is connected to signal ground while its emitter is connected to the emitter of transistor 64 as well as being coupled into the ratemeter circuit through capacitor 66. The collector of transistor 64 is connected to the low voltage line through resistor 76 as well as to the collector of transistor 71, whose emitter receives a signal from capacitor 66. Diode 70 is connected across the emitter-base junction of transistor 71. The collectors of transistors 64 and 71 are also coupled to signal ground through parallel capacitors 74 and 75. The base of transistor 71 is connected to signal ground through capacitor 67, through series resistors 72 and 73, or through output jack 23.

Capacitor 66 and the amplitude of the voltage pulses from the pulse height discriminator determine the amount of charge transferred for each pulse. Capacitor 67 serves as a charge integrator. Diode 70 allows a charge increment to be added to capacitor 67 only on the rising edge of each pulse. Transistor 71 conducts only on the falling edge of each pulse to recharge capacitor 66. A constant drain or discharge path for capacitor 67 is furnished through resistors 72 and 73.

At equilibrium, the average rate of depositing charge on capacitor 67 is equal to the rate of discharge through resistors 72 and 73. Therefore, the average output voltage across capacitor 67 is proportional to the average incoming pulse rate.

To prevent non-linearity resulting from an effective decrease of available charge per pulse as voltage builds up on capacitor 67, the base of transistor 71 is "bootstrapped" to the output voltage. In this way, the output voltage can equal or exceed the input pulse height without significant non-linearity appearing in the ratemeter transfer characteristic. When utilizing pulses having widths of $10^{-7}$ seconds, very high current pulses are required to charge and discharge capacitor 66 fully at the falling and rising edges of the incoming voltage pulses. To prevent these current pulses from appearing at the power supply, decoupling is accomplished by capacitors 74 and 75 and resistor 76.

The magnitude of the ratemeter transfer constant, in output voltage per input pulse rate, is determined by the input pulse amplitude, the value of the series charging capacitor 66 and the value of resistors 72 and 73. In addition, the frequency characteristic or low pass bandwidth of the ratemeter is determined by the value of resistors 72 and 73 and capacitor 67.

The output voltage from the ratemeter is fed into the base of unijunction transistor 80, one terminal of which is biased by the low voltage power supply through load resistor 83, the other terminal of which is connected to signal ground through load resistor 84 and also is connected to controlled rectifier 81. The gate of controlled rectifier 81 allows the signal to be passed to relay 82.

The trigger level of the alarm or reject circuit is established by the intrinsic stand-off ratio or the value of the stable negative resistance of unijunction transistor 80. When the ratemeter output reaches the peak-point voltage of unijunction transistor 80, capacitor 67 rapidly discharges into the gate of controlled rectifier 81. This discharge activates alarm relay 82, which disables unijunction transistor 80, so that the ratemeter output may continue unaffected by any loading by the alarm circuit. Alarm relay 82 also operates a signal light 18 and may be used to operate other mechanisms such as those required to remove a rejected article from an inspection line. The alarm relay 82 remains activated by means of controlled rectifier 81 until the next scanning cycle is initiated by operation of a switch (not shown).

It is also possible with the present invention to determine the particular circumferential level where the wall thickness of a container or bottle is below a minimum standard when the article is being scanned and a defect is discovered, by having the trigger circuit operate control circuits which could be any one of many well-known types. In the preferred embodiment, these control circuits stop the scanning action and hold the source and detector at a level where the defect occurred until it can be examined or marked. The scanning action can then be renewed and completed after which the apparatus may be withdrawn from the article.

Stability of the radiation source itself can be assured, for example, by using a radioactive isotope of relatively long half life rather than a source subject to instrumental changes such as X-ray tubes. An isotope having a twenty year half life decays only about 0.3% per month, so that a monthly calibration adjustment, as far as such a source is concerned, would be adequate for most applications.

Although beta radiation has been mentioned as one form of radiation, it is to be understood that other forms of radiation and penetrating particles may also be used with the method and apparatus described herein. For instance, the source may comprise a small needle or capsule of radium or any other suitable substance either naturally or artificially radioactive and capable of emitting penetrative radiation which will pass through a glass wall, the transmitted radiation being measured by a suitable radiation counter such as a Geiger-Mueller counter or an ionization chamber.

The above description shows that the novel method and apparatus of the present invention provide a simple and convenient means for checking the wall thickness of hollow articles while leaving the articles in an undamaged condition. Furthermore, the novel method and apparatus of the invention permit the inspection of articles differing widely in wall thickness and overall size without the use of a standard sample against which to compare each article to be tested. In addition, the method and apparatus of the invention can automatically indicate the articles which fail to meet a minimal standard, and can remove the article and/or indicate the portion in which the defect occurs. Also, the apparatus of the present invention avoids the geometric problems of earlier devices by maintaining a fixed spatial relationship between the source and the detector. Moreover, the method and apparatus of the present invention avoids the deleterious effects of circuit drift and phototube variations which have been encountered in the past.

From the above description of the invention, it will be apparent that various modifications in the method and apparatus described in detail herein may be made within the scope of the invention. For example, the scanning pattern employed by the present invention may be different. Also, the circuitry used to detect voltage higher than the trigger setting may be in a different form or employ substantially different circuit elements, or the scintillation crystal and multiplier phototube used to detect radiation may be replaced with another detector device such as a Geiger tube. Therefore, the invention is not intended to be limited to the specific details of the method, apparatus, and circuitry described herein, except as may be required by the following claims.

What is claimed is:

1. Apparatus for checking the wall thickness of a hollow article having at least one opening, comprising: a source of beta radiation, said source arranged to project beta particles emitted from said source toward the wall of said hollow article; a beta radiation detector arranged in a substantially fixed spacial relationship with said source and including a scintillation crystal and a multiplier phototube, said detector being arranged to detect those emitted particles which pass through said wall; means for effecting relative movement between said source and said article wall; an amplifier for amplifying the output pulses derived from said multiplier phototube; a pulse height discriminator having a tunnel diode with a high voltage state and a low voltage state and biased to a fixed percentage of its peak current, a transistor arranged to conduct pulses of fixed amplitude from said tunnel diode when said tunnel diode is switched to its high voltage state by pulses from said amplifier, and an inductor adapted to switch said tunnel diode back to its low voltage state after a fixed time delay; a linearized ratemeter circuit for converting the series of pulses of constant amplitude generated by said transistor into an analog voltage signal whose amplitude is indicative of the time-density of radio-active particles which pass through and are not absorbed by the wall of said hollow article; a reject trigger circuit having a unijunction transistor arranged to conduct a signal when the peak point of the analog signal from said linearized ratemeter circuit exceeds the intrinsic stand-off ratio of said unijunction transistor; a controlled rectifier for receiving the signal from said unijunction transistor; and a control relay whose coil is activated by the output signal from said controlled rectifier.

2. Apparatus for testing wall thickness, comprising: a radioactive radiation source; radiation responsive means spaced from said radiation source a predetermined distance sufficient to enable a wall to be tested to be interposed therebetween, said radiation responsive means producing a pulse output with the number of pulses being dependent upon the level of radiation received from said radiation source; a pulse height discriminator having a tunnel diode with a high voltage state and a low voltage state and biased to a fixed percentage of its peak current, a transistor arranged to conduct pulses of fixed amplitude from said tunnel diode when said tunnel diode is switched to its high voltage state by pulses from said radiation responsive means, and an inductor adapted to switch said tunnel diode back to its low voltage state after a fixed time delay; a ratemeter circuit for receiving pulses from said pulse height discriminator and producing an analog voltage signal in response thereto; and a reject trigger circuit for receiving said analog voltage signal and producing a fault indication when said signal exceeds a predetermined level.

3. Apparatus for testing wall thickness, comprising: a radioactive radiation source emitting beta radiation; a beta radiation detector spaced from said radiation source a predetermined distance sufficient to enable a wall to be tested to be interposed therebetween, said beta radiation detector including a scintillation crystal and a multiplier phototube, said detector being arranged to detect those emitted particles which pass through said wall; means for effecting relative movement between said source and said wall; a pulse height discriminator having a tunnel diode with a high voltage state and a low voltage state and biased to a fixed percentage of its peak current, a transistor arranged to conduct pulses of fixed amplitude from said tunnel diode when said tunnel diode is switched to its high voltage state by pulses from said beta radiation detector, and an inductor adapted to switch said tunnel diode back to its low voltage state after a fixed time delay; a ratemeter circuit for converting the series of pulses of constant amplitude generated by said transistor into an analog voltage signal; a reject trigger circuit having a unijunction transistor arranged to conduct a signal when the peak point of the analog signal from said ratemeter circuit exceeds the intrinsic standoff ratio of said unijunction transistor; a control rectifier for receiving the signal from said unijunction transistor; and a control relay whose coil is activated by the output signal from said control rectifier.

References Cited

UNITED STATES PATENTS

| | | | |
|---|---|---|---|
| 2,735,017 | 2/1956 | Beard et al. | 250—235 X |
| 3,076,894 | 2/1963 | Putman et al. | 250—71.5 |
| 3,136,902 | 6/1964 | Kerns | 329—205 |
| 3,271,572 | 9/1966 | Lieber et al. | 250—83.3 |
| 3,339,070 | 8/1967 | Main | 250—71.5 |

RALPH G. NILSON, *Primary Examiner.*

SAUL ELBAUM, *Assistant Examiner.*

U.S. Cl. X.R.

250—83.3; 307—231; 329—205